United States Patent
Li et al.

(10) Patent No.: US 10,015,475 B2
(45) Date of Patent: Jul. 3, 2018

(54) THREE-DIMENSIONAL (3D) DISPLAY DEVICE AND ELECTRONIC APPARATUS

(71) Applicants: Shanghai Tianma Micro-electronics Co., Ltd., Shanghai (CN); Tianma Micro-electronics Co., Ltd., Shenzhen (CN)

(72) Inventors: Jialing Li, Shanghai (CN); Lei Niu, Shanghai (CN); Kang Yang, Shanghai (CN)

(73) Assignees: Shanghai Tianma Micro-electronics Co., Ltd., Shanghai (CN); Tianma Micro-electronics Co., Ltd., Shenzhen (CN)

( * ) Notice: Subject to any disclaimer, the term of this patent is extended or adjusted under 35 U.S.C. 154(b) by 79 days.

(21) Appl. No.: 15/057,656

(22) Filed: Mar. 1, 2016

(65) Prior Publication Data

US 2017/0195657 A1 Jul. 6, 2017

(30) Foreign Application Priority Data

Dec. 31, 2015 (CN) .......................... 2015 1 1031762

(51) Int. Cl.
*H04N 13/04* (2006.01)

(52) U.S. Cl.
CPC ..... *H04N 13/0404* (2013.01); *H04N 13/0406* (2013.01); *H04N 13/0422* (2013.01); *H04N 13/0447* (2013.01)

(58) Field of Classification Search
CPC ............... H04N 13/04; H04N 13/0447; H04N 13/0404; H04N 13/0422

(Continued)

(56) References Cited

U.S. PATENT DOCUMENTS

2002/0190922 A1* 12/2002 Tsao .................... G02B 27/2271
345/32
2008/0152219 A1* 6/2008 Ramanath ................ G09G 5/02
382/162

(Continued)

FOREIGN PATENT DOCUMENTS

CN 1949028 A 4/2007
CN 101493595 A 7/2009

(Continued)

OTHER PUBLICATIONS

Zhulin Li, et al. "3-D Image Matching Technology and Its Development and Application." Shanxi Science and Technology Press, p. 8, Jul. 31, 2007.

*Primary Examiner* — Jay Patel
*Assistant Examiner* — Salame Amr
(74) *Attorney, Agent, or Firm* — Anova Law Group, PLLC

(57) ABSTRACT

A three-dimensional (3D) display and an electronic device are provided. The 3D display has a plurality of sub-pixels arranged in a plurality of sub-pixel repeating groups, and a cylindrical lens grating including a plurality of cylindrical lenses arranged in parallel disposed on top of the display panel and covering all the sub-pixels in the display panel. The sub-pixels have M number of different colors capable of being mixed to generate a white color. M is a positive integer greater than 2, and M number of successive sub-pixels along a first direction have different colors. Two adjacent sub-pixels form a main pixel, any two adjacent main pixels are different, and each sub-pixel repeating group includes one or more main pixels. The cylindrical lens grating divides all the sub-pixels into a plurality of 3D viewpoints of a 3D image, the 3D viewpoint has same sub-pixel arrangement sequences as the sub-pixel repeating groups.

19 Claims, 9 Drawing Sheets

(58) Field of Classification Search
USPC .......................................................... 348/53
See application file for complete search history.

(56) References Cited

U.S. PATENT DOCUMENTS

| | | | |
|---|---|---|---|
| 2009/0207100 A1* | 8/2009 | Fukuchi | G02F 1/133514 345/32 |
| 2011/0249043 A1* | 10/2011 | Sato | G02F 1/167 345/690 |
| 2013/0044372 A1 | 2/2013 | Lo | |
| 2013/0135545 A1* | 5/2013 | Jung | G02F 1/13306 349/33 |

FOREIGN PATENT DOCUMENTS

| | | |
|---|---|---|
| CN | 101511035 A | 8/2009 |
| CN | 102004324 A | 4/2011 |
| CN | 102681244 A | 9/2012 |
| CN | 102707448 A | 10/2012 |
| CN | 102903318 A | 1/2013 |
| CN | 103348687 A | 10/2013 |
| CN | 104570370 A | 4/2015 |

\* cited by examiner

THREE-DIMENSIONAL (3D) DISPLAY DEVICE AND ELECTRONIC APPARATUS

CROSS-REFERENCES TO RELATED APPLICATIONS

This application claims priority of Chinese Patent Application No. 201511031762.9, filed on Dec. 31, 2015, the entire contents of which are hereby incorporated by reference.

FIELD OF THE INVENTION

The present disclosure generally relates to the field of three-dimensional (3D) display technologies and, more particularly, relates to a 3D display device and a corresponding electronic apparatus.

BACKGROUND

With the continuous development of science and technology, more and more electronic devices with display functions are applied in people's daily life and work, which currently have brought great convenience to and become indispensable tools to ordinary people.

Three-dimensional (3D) displays provide a more realistic visual experience to users, such that the users may be able to experience more realistic perspective views. Thus, the 3D display is a trend of electronic devices with display functions. Naked-eyes or autostereoscopic display does not require users to wear polarized eyeglasses, which offers a more convenient 3D experience and becomes a main research topic of 3D electronic display devices.

To realize an autostereoscopic electronic display device, a grating is often disposed on top of the display panel of an electronic device. The grating splits or divides pixels of the display panel into multiple 3D viewpoints or view zones, through which the 3D display is realized. However, in a current 3D electronic display device, the multiple 3D viewpoints often require an individual driving method for displaying 3D images, and such driving method may be complicated for certain applications.

The disclosed 3D display device and electronic apparatus are directed to solve one or more problems set forth above and other problems.

BRIEF SUMMARY OF THE DISCLOSURE

One aspect of the present disclosure includes a three-dimensional (3D) display. The 3D display comprises a display panel including a plurality of sub-pixels arranged in a plurality of sub-pixel repeating groups, and a cylindrical lens grating including a plurality of cylindrical lenses arranged in parallel disposed on top of the display panel and covering all the sub-pixels in the display panel. The sub-pixels have M number of different colors, and the M number of different colors are capable of being mixed to generate a white color, where M is a positive integer and greater than 2. M number of successive sub-pixels along a first direction have different colors. Two adjacent sub-pixels form a main pixel, any two adjacent main pixels are different, and each sub-pixel repeating group includes one or more main pixels. When the display panel displays a 3D image, the cylindrical lens grating divides all the sub-pixels into a plurality of 3D viewpoints of the 3D image. The 3D viewpoint has same sub-pixel arrangement sequences as the sub-pixel repeating groups.

Another aspect of the present disclosure includes an electronic device. The electronic device comprises a 3D display. The 3D display comprises a display panel including a plurality of sub-pixels arranged in a plurality of sub-pixel repeating groups, and a cylindrical lens grating including a plurality of cylindrical lenses arranged in parallel disposed on top of the display panel and covering all the sub-pixels in the display panel. The sub-pixels have M number of different colors, and the M number of different colors are capable of being mixed to generate a white color, where M is a positive integer and greater than 2. M number of successive sub-pixels along a first direction have different colors. Two adjacent sub-pixels form a main pixel, any two adjacent main pixels are different, and each sub-pixel repeating group includes one or more main pixels. When the display panel displays a 3D image, the cylindrical lens grating divides all the sub-pixels into a plurality of 3D viewpoints of the 3D image. The 3D viewpoint has same sub-pixel arrangement sequences as the sub-pixel repeating groups.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
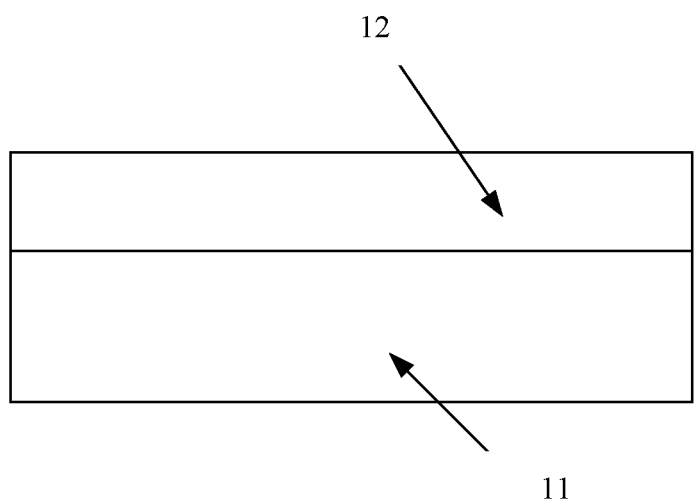
FIG. 1 illustrates a cross-sectional view of an exemplary 3D display consistent with disclosed embodiments.

Reference will now be made in detail to exemplary embodiments of the invention, which are illustrated in the accompanying drawings. Hereinafter, embodiments consistent with the disclosure will be described with reference to drawings. It is apparent that the described embodiments are some but not all of the embodiments of the present invention. Based on the disclosed embodiments, persons of ordinary skill in the art may derive other embodiments consistent with the present disclosure, all of which are within the scope of the present invention.

In a naked-eyes or autostereoscopic display based on light-splitting gratings, a different view image has to be observed by each eye of a viewer at different spatial positions, and these spatial positions may be referred as 3D viewpoints. To realize multiple 3D viewpoints, a plurality of sub-pixels in the display panel may be divided into multiple sets of sub-pixels according to some pattern rules, and each set of sub-pixels may form a view image corresponding to one 3D viewpoint. Data of different view images may be assigned to different sets of sub-pixels, and light from each set of sub-pixels may be deflected to the corresponding 3D viewpoint. Thus, each eye of the viewer may be able to observe different view images at different 3D viewpoints. It should be noted that, only a portion of total sub-pixels in the display panel are observed at each 3D viewpoint.

Generally, a 3D display may be realized by at least two 3D viewpoints. For example, the two 3D viewpoints may be a first 3D viewpoint where the left view image of the 3D image may be observed, and a second 3D viewpoint where the right view image of the 3D image may be observed. A plurality of sub-pixels in the display panel may be divided into two sets of sub-pixels, which may be corresponding to the first 3D viewpoint and the second 3D viewpoint, respectively. Data of the left view image may be assigned to the set of sub-pixels corresponding to the first 3D viewpoint, and data of the right view image may be assigned to the set of sub-pixels corresponding to the second 3D viewpoint. Light from the set of sub-pixels corresponding to the first 3D viewpoint may be deflected to the first 3D viewpoint, and light from the set of sub-pixels may be deflected to the second 3D viewpoint. Thus, when the viewer's left eye and right eye are respectively placed at the first 3D viewpoint and the second 3D viewpoint, the 3D image is perceived by the viewer.

Multiple 3D viewpoints (i.e., more than two 3D viewpoints) may generate a better 3D display performance. For example, the 3D display with multiple 3D viewpoints may accommodates multiple viewers, each viewer may be able to see the 3D image from his or her own viewing direction. On the other hand, the viewer may be able to look around objects in a scene (i.e., the 3D image) by simply moving his or her head, i.e., motion parallax can also be experienced. Complex head tracking devices may not be required and an associated lag problem may be avoided.

However, sets of sub-pixels corresponding to the 3D viewpoints may require a driving mechanism different from the 2D display, which often use all sub-pixels on the display panel. For example, in the 3D display with two 3D viewpoints, the sets of sub-pixels may be driven by a display driver which may be able to receive view images and to interlace the data of the left view image and the right view image, which may be different from a 2D display driver. Thus, the fabrication cost of the 3D electronic display device may be increased.

According to the disclosed embodiments, the present disclosure provides an improved 3D display. The 3D display may include a display panel and a cylindrical lens grating disposed on top of the display panel. The display panel may include a plurality of sub-pixels in M number of colors, wherein M is a positive integer larger than 2. M number of successive sub-pixels along a first direction may be in different colors, and the M number of colors may be mixed to generate white color. Two adjacent sub-pixels may form a main pixel, and any two adjacent main pixels may be different.

The display panel may include a plurality of sub-pixel repeating groups. The sub-pixel repeating group may include a plurality of sub-pixels. The pixel repeating group may be a smallest repeating group of the display panel.

The cylindrical lens grating may be disposed outside the display panel and covering all the sub-pixels in the display panel, for example, on top of the display panel. When the display panel displays a 3D image, the cylindrical lens grating may divide all the sub-pixels in the display panel into a plurality of 3D viewpoints of the 3D image. The 3D viewpoint may have a same sub-pixel arraignment as the sub-pixel repeating group.

Further, the cylindrical lens grating may include a plurality of cylindrical lenses parallel arranged. The cylindrical lens grating may have predetermined parameters according to the sub-pixel layout or sub-pixel layout in the display panel. The cylindrical lens may have a length $L=a*b+c$ along an orientation of the cylindrical lenses, where a is a number of the sub-pixel repeating groups covered by the cylindrical lens along the orientation of the cylindrical lenses, b is a length of the sub-pixel repeating group along the orientation of the cylindrical lenses, and c is a length of the sub-pixel along the orientation of the cylindrical lenses.

Based on the cylindrical lens grating with the predetermined parameters, the sub-pixels in the 3D viewpoints may have a same layout (or same arrangement sequences) as the sub-pixels in the repeated sub-pixel groups. Thus, when displaying a 3D image, the 3D viewpoints may be driven by a same driving method as a 2D display panel. Such a 3D display driving method may be simple and low cost. Because an individual driving method may not be required, the 3D display driving may adopt a same driving chip as the 2D display driving.

Figure 2:
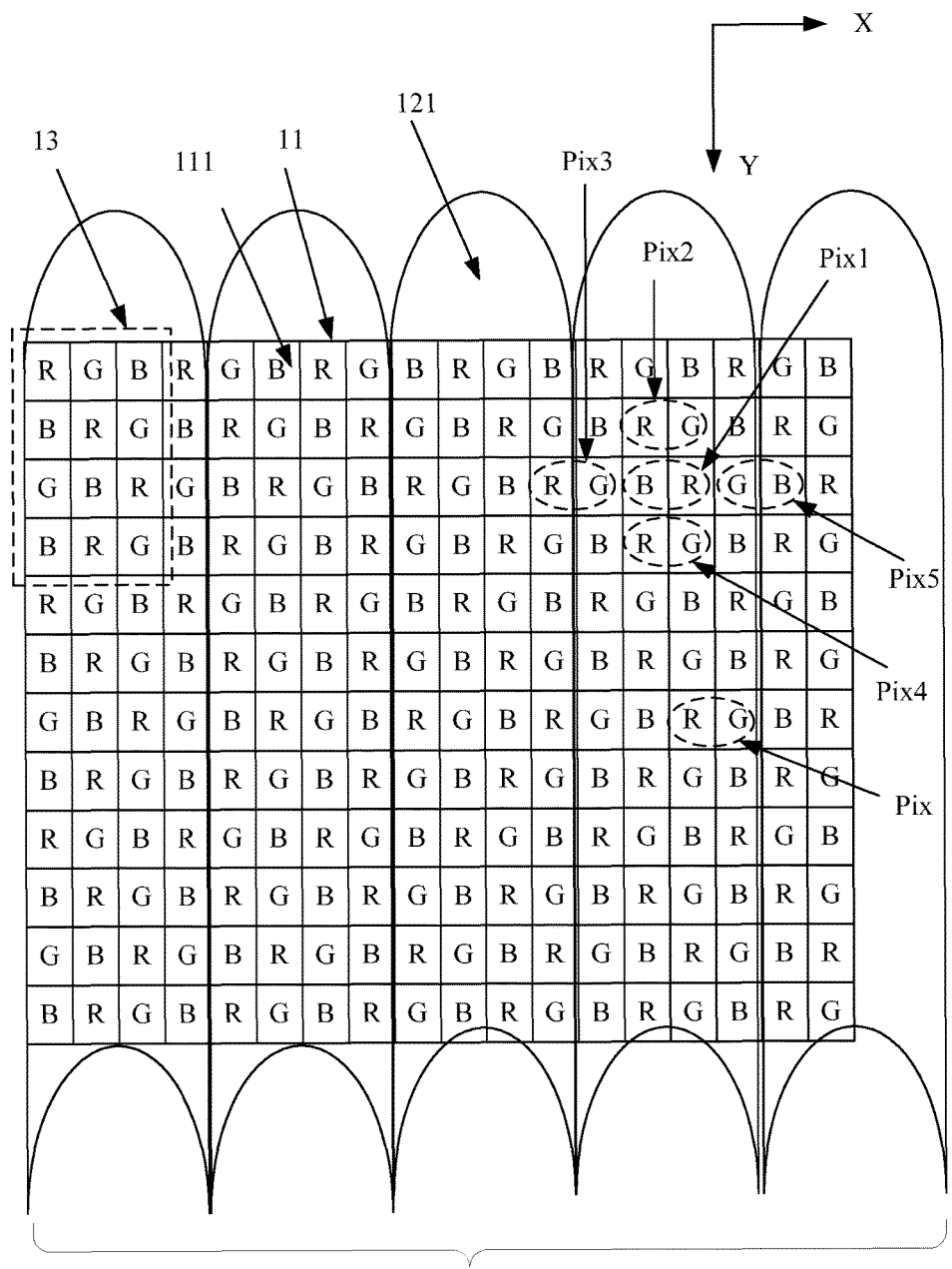
FIG. 2 illustrates a top view of an exemplary 3D display consistent with disclosed embodiments.
Figure 3:
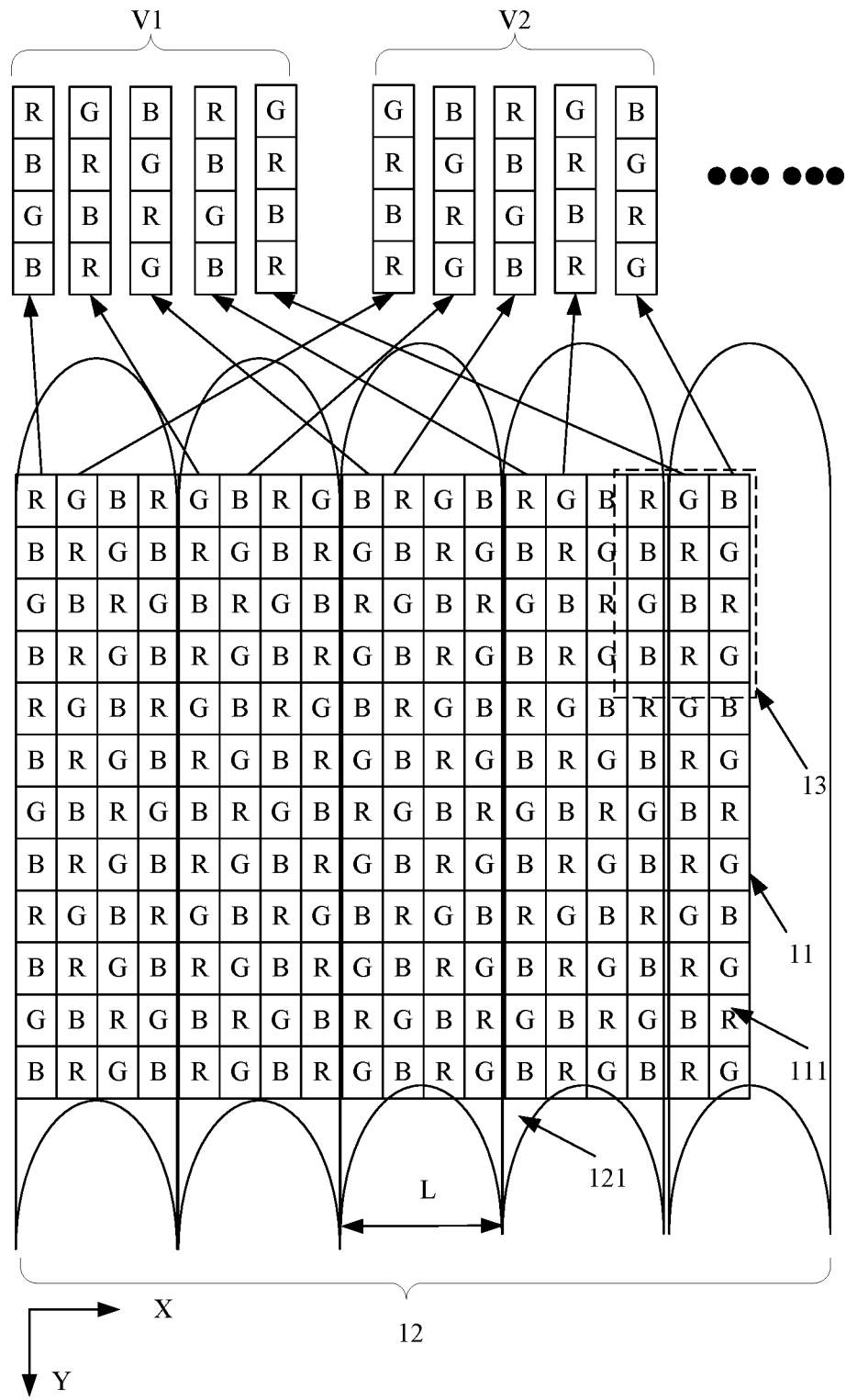
FIG. 3 illustrates a principle of an exemplary 3D display in FIG. 2 consistent with disclosed embodiments.

FIG. 1 illustrates a cross-sectional view of an exemplary 3D display consistent with disclosed embodiments. FIG. 2 illustrates a top view of an exemplary 3D display consistent with disclosed embodiments. FIG. 3 illustrates a principle of an exemplary 3D display shown in FIG. 2.

As shown in FIG. 1 and FIG. 2, the 3D display may include a display panel 11 and a cylindrical lens grating 12 disposed on top of the display panel 11. The cylindrical lens grating 12 may directly contact the display panel 11, or have a certain distance away from the display panel 11. The display panel 11 may include a plurality of sub-pixels 111 having different colors (e.g., three different colors), which may be alternately arranged. That is, any two adjacent sub-pixels may have different colors, and any three sub-pixels continuously arranged in a first direction X may also have different colors.

Further, the different colors may have different color coordinates in a CIE 1931 color chromaticity diagram, and the color coordinates of the different colors may be connected to form a closed pattern, which may include a white area in the CIE 1931 chromaticity diagram. Thus, the different colors together may provide a wide color gamut including the white area in the CIE 1931 chromaticity diagram, and the 3D display may have a larger color gamut and a better color performance.

The display panel 11 may be a liquid crystal display (LCD) panel. In certain embodiments, the display panel 11 may be a light emitting diode (LED) display panel, organic light emitting diode (OLED) display panel, etc. The sub-pixels 111 with three different colors are only for illustrative purposes and are not intended to limit the scope of the present invention. In other embodiments, the sub-pixels 111 may be in M number of colors, where M is a positive integer larger than 3. However, the M number of colors may need to have different color coordinates in the CIE 1931 chromaticity diagram, and the color coordinates of the M number of colors may be connected to form a closed pattern, which may include the white area in the CIE 1931 chromaticity diagram.

In one embodiment, the display panel shown in FIG. 2 and FIG. 3 may include sub-pixels 111 with three different colors: red sub-pixels (R), green sub-pixels (G) and blue sub-pixels (B), which is only for illustrative purposes and is not intended to limit the scope of the present invention.

Further, as shown in FIG. 2, in the display panel 11, two adjacent sub-pixels 111 may form a main pixel Pix or a pixel Pix, and any two adjacent main pixels Pix, in which a side of one main pixel Pix is adjacent to a side of the other adjacent main pixel Pix, may be different. In particular, the two sub-pixels 111 in one main pixel Pix may not be one-to-one corresponding to the two sub-pixels 111 in the other adjacent main pixel Pix. That is, two adjacent main pixels Pix may have a different sub-pixel layout.

For example, as shown in FIG. 2, a blue sub-pixel B and a red sub-pixel R adjacent in the first direction X may form a main pixel Pix1, a red sub-pixel R and a green sub-pixel G adjacent in the first direction X may form a main pixel Pix2, a red sub-pixel R and the green sub-pixel G adjacent in the first direction X may form a main pixel Pix3, a red sub-pixel R and a green sub-pixel G adjacent in the first direction X may form a main pixel Pix4, and a green sub-pixel G and a blue sub-pixel B adjacent in the first direction X may form a main pixel Pix5.

The main pixel Pix2, the main pixel Pix3, the main pixel Pix4 and the main pixel Pix5 may be respectively adjacent to the main pixel Pix1 and, meanwhile, may respectively have a sub-pixel layout different from the main pixel Pix1. The colors of the two sub-pixels 111 forming the main pixel Pix2, the main pixel Pix3, the main pixel Pix4 and the main pixel Pix5 may also be different from the colors of the two sub-pixels 111 forming the main pixel Pix1, respectively.

As described above, the main pixel Pix may include two sub-pixels 111. Any main pixel Pix may be able to generate white light for display images, through sharing a sub-pixel 111 having a color different from the colors of the two sub-pixels in the main pixel Pix with one or more adjacent main pixels Pix. That is, through sharing or multiplexing a sub-pixel 111 having a color different from the colors of the two sub-pixels in the main pixel Pix with one or more adjacent main pixels Pix, any main pixel Pix itself may equivalently consist of sub-pixels 111 of three colors.

For example, the main pixel Pix1 may share the green sub-pixel G with one or more of the adjacent main pixel Pix2, the main pixel Pix3, the main pixel Pix4 and the main pixel Pix5 to display images, based on a time multiplexing sub-pixel driving method. Due to the persistence of vision, human eyes may be able to observe full colors.

As a comparison, the display unit (or called as the pixel, the main pixel) in a conventional display panel often includes three primary color sub-pixels (i.e., a red sub-pixel R, a green sub-pixel G, and a blue sub-pixel B), while the main pixel in the disclosed display panel may only include two sub-pixels 111. The number of distinct pixels or main pixels in each dimension of the display panel often determines the display resolution of the display panel. The display resolution is usually quoted as width×height, with the units in pixels. For example, "1024×768" means the width is 1024 pixels and the height is 768 pixels.

Thus, given a fixed display panel dimension and a fixed display resolution, the number of sub-pixels 111 required for the disclosed display device may be significantly reduced, because one main pixel may only include two sub-pixels. Accordingly, the number of data lines may be reduced, the driving method may be simplified, and the fabrication cost of the display panel may be reduced. On the other hand, given a fixed display panel dimension, more main pixels Pix may be formed, and the display resolution may be improved.

Further, as shown in FIG. 2, the display panel 11 may include a plurality of sub-pixel repeating groups 13, which may include a plurality of sub-pixels. The sub-pixel repeating group 13 may be the smallest repeating unit of the display panel 11. For example, when the 2D display panel is driven by a display driver, a predetermined sub-pixel driving algorithm (e.g., a sub-pixel rendering algorithm) may be applied to the sub-pixels in each sub-pixel repeating group 13. That is, the sub-pixel layout in the sub-pixel repeating group 13 may be the smallest unit to carry out the predetermined sub-pixel driving algorithm. Through configuring the display panel 11 to include the plurality of sub-pixel repeating groups 13, the sub-pixels 111 may be orderly arranged in the display panel 11, which may be favorable for fabricating the sub-pixels and improving the production efficiency.

The sub-pixel 111 may have a rectangular shape, and all the sub-pixels 111 may be arranged in an array, i.e. a sub-pixel array. A row direction of the array may be parallel to the first direction X, and a column direction of the array may be parallel to a second direction Y. The second direction Y may be perpendicular to the first direction X. The main pixel Pix may be formed by two sub-pixels adjacent in the row direction (i.e., the first direction X) of the array, or two sub-pixels adjacent in the column direction (i.e., the second direction Y) of the array.

In one embodiment, when the dimension of the sub-pixel 111 in the first direction X is smaller than the dimension of the sub-pixel 111 in the second direction Y, the main pixel Pix may be formed by two sub-pixels adjacent in the first direction X. In another embodiment, when the dimension of the sub-pixel 111 in the first direction X is larger than the dimension of the sub-pixel 111 in the second direction Y, the main pixel Pix may be formed by two sub-pixels adjacent in the second direction Y.

As shown in FIG. 2 and FIG. 3, the sub-pixel repeating group 13 may include a plurality of sub-pixels 111 with three different colors: red sub-pixels R, green sub-pixels G and blue sub-pixels B. The sub-pixel repeating group 13 may be a 4×3 matrix, i.e., the plurality of sub-pixels 111 in the sub-pixel repeating group 13 may be arranged as a 4×3 matrix. In the sub-pixel repeating group 13, two adjacent sub-pixels 111 in a same row may have different colors, two adjacent sub-pixels 111 in a same column may have different colors, and three successive sub-pixels 111 may also have different colors.

For example, as shown in FIG. 2 and FIG. 3, the three sub-pixels 111 in the first row of the sub-pixel repeating group 13 (i.e., 4×3 matrix) may sequentially be the red sub-pixel R, the green sub-pixel G and the blue sub-pixel B. The three sub-pixels 111 in the second row of the sub-pixel repeating group 13 may sequentially be the blue sub-pixel B, the red sub-pixel R, and the green sub-pixel G. The three sub-pixels 111 in the third row of the sub-pixel repeating group 13 may sequentially be the green sub-pixel G, the blue sub-pixel B, and the red sub-pixel R. The three sub-pixels 111 in the fourth row of the sub-pixel repeating group 13 may sequentially be the blue sub-pixel B, the red sub-pixel R, and the green sub-pixel G.

It should be noted that, when the sub-pixel repeating group 13 includes the plurality of sub-pixels 111 having three colors arranged in the matrix, the sub-pixel layout in the sub-pixel repeating group 13 shown in FIG. 2 and FIG. 3 is only for illustrative purposes and is not intended to limit the scope of the present invention.

The sub-pixels 111 in the 3D viewpoint may have a same layout as the sub-pixels 111 in the display panel 11. That is, the sub-pixel 111 layout in the 3D viewpoint may be the same as the sub-pixel 111 layout in the display panel 11. The cylindrical lens grating 12 may cover all the sub-pixels 111 in the display panel 11, such that all the sub-pixels 111 may be involved to constitute the plurality of 3D viewpoints, and all the sub-pixels 111 may be utilized for displaying 3D images. Thus, the utilization of the sub-pixels 111 may be improved.

Further, the cylindrical lens grating 12 may include a plurality of cylindrical lenses 121, which may be arranged in parallel. In the disclosed embodiments, the cylindrical lenses 121 may be arranged in parallel along the first direction X, i.e., the orientation of the cylindrical lenses 121 may be the first direction X. Along the orientation of the cylindrical lenses 121 (i.e., the first direction X), the cylindrical lens 121 may cover one sub-pixel repeating group 13 and one adjacent sub-pixel 111.

In particular, along the orientation of the cylindrical lenses 121, the cylindrical lens 121 may cover three columns of sub-pixels (i.e., three sub-pixel columns) in one sub-pixel repeating groups 13 and an adjacent sub-pixel column. That is, the cylindrical lens 121 may cover four sub-pixel columns in total. Along the orientation of the cylindrical lenses 12, the length of the cylindrical lens 121 may be equal to the length of one sub-pixel repeating group 13 plus the length of one sub-pixel 111.

In particular, along the orientation of the cylindrical lenses 121, the length L of one cylindrical lens 121 may be calculated as L=a*b+c, where a denotes the number of the sub-pixel repeating groups 13 covered by the cylindrical lenses 121 along the orientation of the cylindrical lenses 121, b denotes the length of one sub-pixel repeating groups 13 along the orientation of the cylindrical lenses 121, and c denotes the length of one sub-pixel 111 covered by the cylindrical lens along the orientation of the cylindrical lenses 121.

In the disclosed embodiments, along the orientation of the cylindrical lenses 121, one cylindrical lens 121 may cover one sub-pixel repeating group 13, i.e., a=1. In certain embodiments, along the orientation of the cylindrical lenses 121, one cylindrical lens 121 may cover more than one sub-pixel repeating groups 13, i.e., a may be a positive integer larger than 1.

FIG. 3 illustrates a principle of an exemplary 3D display in FIG. 2 consistent with disclosed embodiments. As shown in FIG. 3, the plurality of cylindrical lenses 121 may be arranged parallel to the first direction X. Along the first direction X, each cylindrical lens 121 may cover four sub-pixel columns, which may be a first sub-pixel column, a second sub-pixel column, a third sub-pixel column, and a fourth sub-pixel column from left to right.

Light emitted from the same sub-pixel column (from left to right) among the four sub-pixel columns covered by each cylindrical lens 121 may be refracted by the corresponding cylindrical lens 121 into parallel light, forming a 3D viewpoint (or a view image corresponding to the 3D viewpoint). That is, light emitted from different sub-pixel column among the four sub-pixel columns covered by each cylindrical lens 121 may be refracted by the corresponding cylindrical lens 121 to different spatial positions, forming different 3D viewpoints. Thus, in the disclosed embodiments, the cylindrical lens grating 12 may divide the display panel 11 into four 3D viewpoints. For example, from left to right, the four 3D viewpoints may sequentially be a first 3D viewpoint, a second 3D viewpoint, a third 3D viewpoint and a fourth 3D viewpoint.

FIG. 3 also schematically illustrates a regional sub-pixel layout in a first 3D viewpoint V1 and a second 3D viewpoint V2, respectively. As shown in FIG. 3, the cylindrical lens grating 12 may include five cylindrical lenses 121, and each cylindrical lens 121 may cover four sub-pixel columns. However, the most right cylindrical lens 121 may only cover two sub-pixel columns or other number of remaining columns. In practical manufacturing, the number of sub-pixel columns in the display panel may be configured to be a multiple of four, thus, each cylindrical lens 121 may cover four sub-pixel columns. Other number of columns may also be used.

The first 3D viewpoint V1 may consist of five sub-pixel columns, which may sequentially be the first sub-pixel column covered by each of the five cylindrical lenses 121 from left to right. The second 3D viewpoint V2 may also include five sub-pixel columns, which may sequentially be the second sub-pixel column covered by each of the five cylindrical lenses 121 from left to right.

Similarly, the third 3D viewpoint (not shown in FIG. 3) may consist of the third sub-pixel column covered by each of the five cylindrical lenses 121, and the fourth 3D viewpoint (not shown in FIG. 3) may consist of the fourth sub-pixel column covered by each of the five cylindrical lenses 121. However, because the most right cylindrical lens 121 only covers two sub-pixel columns, i.e., the first sub-pixel column and the second sub-pixel column, the third 3D viewpoint and the fourth 3D viewpoint may consist of four sub-pixel columns, respectively, which may be one sub-pixel column less than the first 3D viewpoint V1.

For any 3D viewpoint, the two adjacent sub-pixel columns included in the 3D viewpoint may be the $i^{th}$ sub-pixel column and the $(i+4)^{th}$ sub-pixel columns in the sub-pixel array. Because the sub-pixel repeating group 13 is a 4×3 matrix, the $(i+1)^{th}$ sub-pixel column and the $(i+4)^{th}$ sub-pixel column may have the same sub-pixel layout. Thus, the sub-pixels 111 in the 3D viewpoint may have a same layout as the sub-pixels 111 in the display panel 11. For example, as shown in FIG. 3, the sub-pixels 111 in the 3D viewpoint (i.e., V1 and V2) may have the same layout as a certain region of the display panel 11.

In the disclosed embodiments, each cylindrical lens 121 may cover one sub-pixel repeating group in the first direction X, i.e., a=1, and the 3D display may consist of four viewpoints and exhibit a better 3D display performance. In certain embodiments, each cylindrical lens 121 may cover more than one sub-pixel repeating groups in the first direction X, i.e., a may be larger than 1, while the other structure may keep the same. Thus, the 3D display may consist of more than four 3D viewpoints, but each 3D viewpoint may have a lower resolution in the first direction X, i.e., a lower horizontal resolution, than the 3D viewpoint in the 3D display having four 3D viewpoints. Because the horizontal resolution of the 3D display may be shared by more 3D viewpoints.

The horizontal resolution of each 3D viewpoint may be calculated as the horizontal resolution of the 3D display divided by the number of 3D viewpoints formed in the 3D display. For example, if a 2D display has a resolution of 1920×1080 and is designed for a four-view 3D mode, the resolution of each 3D viewpoint may become 480×1080. If a 2D display has a resolution of 1920×1080 and is designed for a five-view 3D mode, the resolution of each 3D viewpoint may become 384×1080. Thus, a larger number of 3D viewpoints may result a lower horizontal resolution of each 3D viewpoint. However, the resolution along the second direction Y, i.e. a vertical resolution, may not be shared by the multiple 3D viewpoints, thus each 3D viewpoint may still have the same vertical resolution as the 2D display.

Thus, through configuring the 3D display to include four 3D viewpoints, each viewpoint may have a higher resolution as compared to the 3D display including more than four 3D viewpoints, and the 3D image may have a higher resolution accordingly. It should be noted that, the number of the 3D viewpoints in the 3D display may not be limited to four, which may vary with various factors, such as the orientation of the cylindrical lenses 121, the sub-pixel repeating group matrix and the number of the sub-pixel repeating groups covered by one cylindrical lens 121, etc.

Based on the cylindrical lens grating 12 with predetermined parameters, the sub-pixels 111 in the 3D viewpoint may have a same layout as the sub-pixels 111 in the repeated sub-pixel group 13. For example, predetermined parameters of the cylindrical lens grating 12 may include the orientation of the cylindrical lens 121, the length L of the cylindrical lens 121 along the orientation of the cylindrical lens 121, the number of the sub-pixel repeating groups covered by the cylindrical lens 121, etc.

Thus, when displaying a 3D image, the 3D viewpoints may be driven by a same driving method as the display panel 11 displaying a 2D image. For example, the predetermined sub-pixel driving algorithm (e.g., a sub-pixel rendering algorithm) applied to the sub-pixels in the sub-pixel repeating group 13 may still be applicable to the sub-pixels in the 3D viewpoint, because the sub-pixel layout in the sub-pixel repeating group 13 and the sub-pixel layout in the 3D viewpoint are the same. Such a 3D display driving method may be simple and low cost.

On the other hand, because the sub-pixels 111 in the 3D viewpoint may have a same layout as the sub-pixels 111 in the repeated sub-pixel group 13, any two adjacent sub-pixels in each 3D viewpoint may also form one main pixel. Compared with a 3D display having the same number of 3D viewpoints, the 3D viewpoints in the disclosed 3D display may have a higher resolution and a better image performance.

Figure 4:
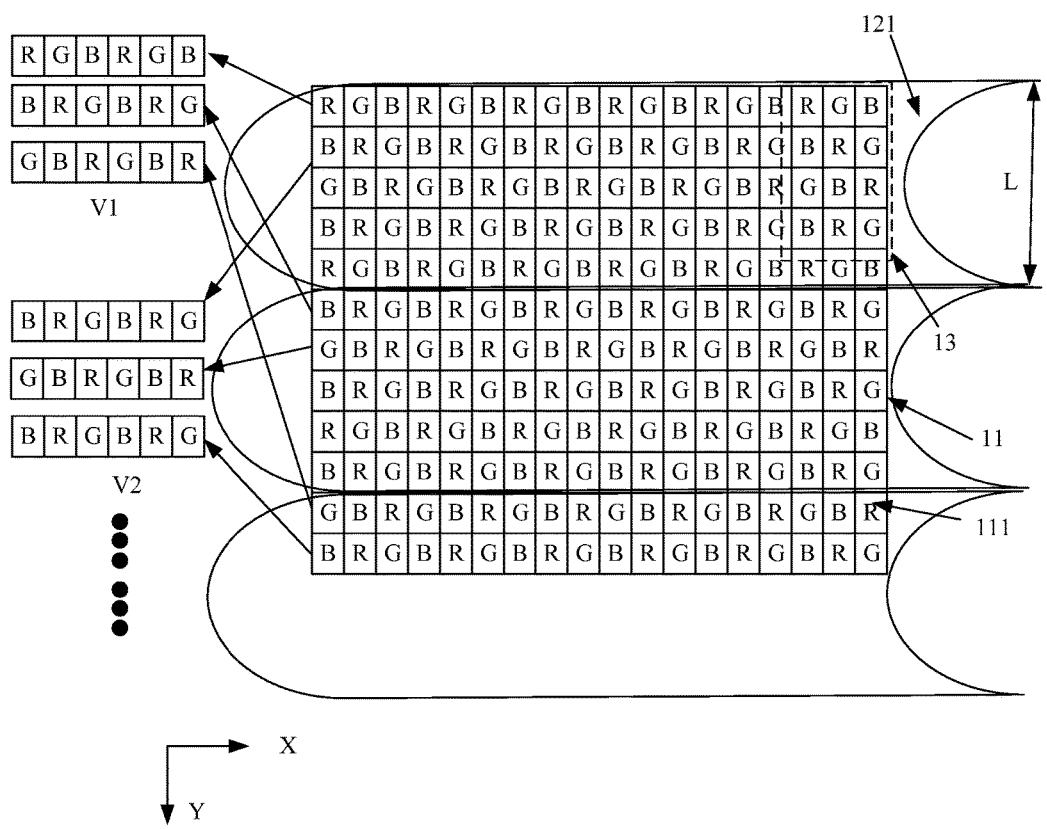
FIG. 4 illustrates a top view of another exemplary 3D display consistent with disclosed embodiments.

FIG. 4 illustrates a top view of another exemplary 3D display consistent with disclosed embodiments. The similarities between FIG. 3 and FIG. 4 may not be repeated here, while certain differences may be illustrated. Compared with the 3D display shown in FIG. 3, the 3D display shown in FIG. 4 may have a different orientation of the cylindrical lenses. As shown in FIG. 4, the orientation of the cylindrical lenses 121 may be parallel to the second direction Y.

In particular, along the second direction Y (i.e., the orientation of the cylindrical lenses 121), the number of the sub-pixel repeating groups 13 covered by one cylindrical lens 121 may be a=1, and one cylindrical lens 121 may cover four rows of sub-pixels (i.e., four sub-pixel rows) in one sub-pixel repeating groups 13 and an adjacent sub-pixel row. That is, along the orientation of the cylindrical lenses 121, one cylindrical lens 121 may cover five sub-pixel rows, and the length L of one cylindrical lens 121 may be equivalent to the total length of five successive sub-pixels 111.

Based on the principle of forming 3D viewpoints explained in FIG. 3, among the five sub-pixel rows covered by each cylindrical lens 121, different sub-pixel rows may form different 3D viewpoints. Thus, the cylindrical lens grating may divide the display panel 11 into five 3D viewpoints.

Because the orientation of the cylindrical lenses 121 may be parallel to the second direction Y, when the number of the sub-pixel repeating groups 13 covered by one cylindrical lens 121 along the second direction Ya=1, the minimum number of the 3D viewpoints formed in the display panel 11 may be five. For example, from top to bottom, the five 3D viewpoints may sequentially be a first 3D viewpoint, a second 3D viewpoint, a third 3D viewpoint, a fourth 3D viewpoint and a fifth 3D viewpoint.

Thus, the disclosed 3D display may provide more 3D viewpoints (i.e., five 3D viewpoints) and a better 3D image performance accordingly. On the other hand, forming five 3D viewpoints in the 3D display may not significantly reduce the image resolution of each 3D viewpoint. That is, an image resolution reduction caused by excessive 3D viewpoints may be prevented.

FIG. 4 also schematically illustrates a regional sub-pixel layout in a first 3D viewpoint V1 and a second 3D viewpoint V2, respectively. As shown in FIG. 4, the cylindrical lens grating 12 may include three cylindrical lenses 121, and each cylindrical lens 121 may cover five sub-pixel rows. From top to bottom, the five sub-pixel rows may sequentially be a first sub-pixel row, a second sub-pixel row, a third sub-pixel row, a fourth sub-pixel row and a fifth sub-pixel row. Along the orientation of the cylindrical lenses 121 (i.e., the second direction Y), the length L of the cylindrical lens 121 may be equal to the total length of five successive sub-pixels 111.

For example, the first 3D viewpoint V1 may consist of three sub-pixel rows. From top to bottom, the three sub-pixel rows may sequentially be the first sub-pixel row covered by each of the three cylindrical lenses 121. The second 3D viewpoint V2 may consist of three sub-pixel rows. From top to bottom, the five sub-pixel rows may sequentially be the second sub-pixel row covered by each of the three cylindrical lenses 121.

Similarly, the third 3D viewpoint (not shown in FIG. 4) may consist of the third sub-pixel row covered by each of the three cylindrical lenses 121, the fourth 3D viewpoint (not shown in FIG. 4) may consist of the fourth sub-pixel row covered by each of the three cylindrical lenses 121, and the fifth 3D viewpoint (not shown in FIG. 4) may consist of the fifth sub-pixel row covered by each of the three cylindrical lenses 121. However, because the most bottom cylindrical lens 121 only covers two sub-pixel rows, i.e., the first sub-pixel row and the second sub-pixel row, the third 3D viewpoint, the fourth 3D viewpoint and the fifth 3D viewpoint may consist of two sub-pixel rows, respectively, which may be one sub-pixel row less than the first 3D viewpoint V1.

It should be noted that, similar to the 3D display shown in FIGS. 1-3, the 3D display shown in FIG. 4 may also realize a high image resolution. However, in the 3D display shown in FIG. 4, the 3D visual effects may be mainly exhibited in the second direction Y. For example, the vertical resolution of the 3D display may be shared by the five 3D viewpoints. If a 2D display has a 1920×1080 resolution and is designed for a five-view 3D mode, the resolution of each 3D viewpoint may become 1920×216. However, the horizontal resolution may not be shared by the five 3D viewpoints, thus each 3D viewpoint may have the same horizontal resolution as the 2D display.

Figure 5:
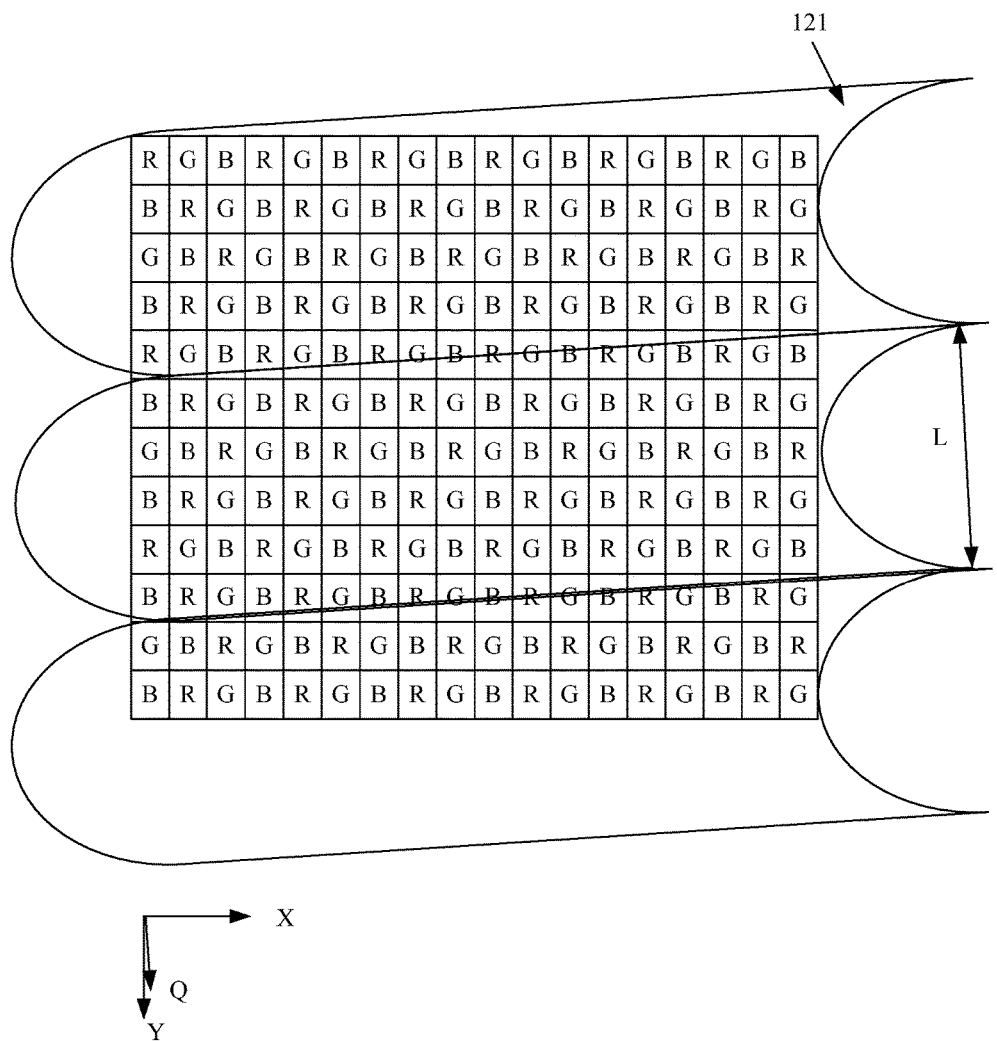
FIG. 5 illustrates a top view of another exemplary 3D display consistent with disclosed embodiments.

FIG. 5 illustrates a top view of another exemplary 3D display consistent with disclosed embodiments. The similarities between FIG. 5 and FIG. 4 may not be repeated here, while certain differences may be illustrated. Compared with the 3D display shown in FIG. 4, the cylindrical lenses shown in FIG. 5 may have a different orientation.

As shown in FIG. 5, the orientation of the cylindrical lenses 121 may be parallel to a third direction Q, which may have an angle with respect to the second direction. On the other hand, the third direction Q may not be perpendicular to either of the first direction X and the second direction Y. The angle between the third direction Q and the second direction Y may be approximately 1°-30°. The length L of the cylindrical lens 121 along the third direction Q may be equal to the total length of five successive sub-pixels 111 along the third direction Q.

In the disclosed embodiments, along the third direction Q (i.e., the orientation of the cylindrical lenses 121), the number of the sub-pixel repeating groups 13 covered by one cylindrical lens 121 may be a=1, and one cylindrical lens 121 may equivalently cover four sub-pixel rows in one sub-pixel repeating groups 13 and an adjacent sub-pixel row. That is, the length L of the cylindrical lens 121 along the third direction Q may be equivalent to the total length of five successive sub-pixels 111 along the third direction Q.

It should be noted that, similar to the 3D display shown in FIG. 4, the 3D display shown in FIG. 5 may also provide a high resolution. In addition, the orientation may have an angle with respect to the second direction Y, i.e., the orientation of the cylindrical lenses 121 may have an angle with respect to the column direction of the sub-pixel. Thus, Moirë patterns may be effectively reduced or eliminated in the 3D display shown in FIG. 5. Moirë patterns often appear as ripples, waves, and wisps of intensity variations superimposed on the screen image, which may be due to the interference created by the stacked pair of 1D periodic structures: a cylindrical lens and a sub-pixel structure. Because the Moirë patterns may be effectively reduced or eliminated, the image performance of the 3D display may be improved accordingly.

Further, because of the angle between the orientation of the cylindrical lenses 121 and the second direction Y, both the horizontal resolution and the vertical resolution of each 3D viewpoint may be reduced. Although a total resolution of each 3D viewpoint is still reduced, the horizontal resolution and the vertical resolution of each 3D viewpoint may get balanced, and each 3D viewpoint may have a more uniform resolution.

Figure 6:
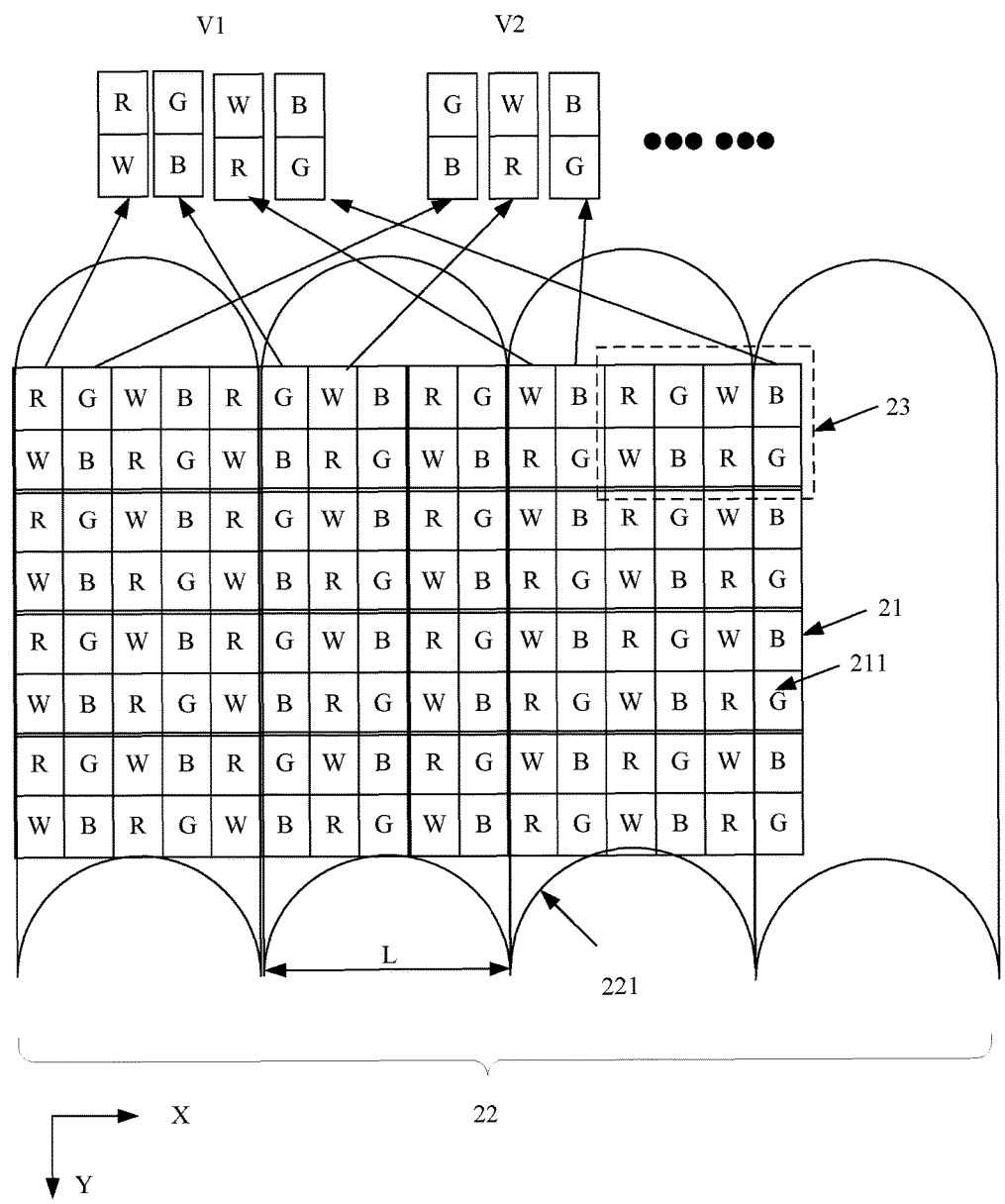
FIG. 6 illustrates a top view of another exemplary 3D display consistent with disclosed embodiments.

FIG. 6 illustrates a top view of another exemplary 3D display consistent with disclosed embodiments. The similarities between FIGS. 1-3 and FIG. 6 may not be repeated here, while certain differences may be illustrated. Compared with the 3D displays shown in FIGS. 1-3, the 3D display shown in FIG. 6 may include different sub-pixel repeating groups, and the sub-pixel layout in the display panel may also be different accordingly.

As shown in FIG. 6, the 3D display may include a display panel 21 and a cylindrical lens grating 22 disposed on top of the display panel 21. The cylindrical lens grating 22 may directly contact the display panel 21, or have a certain distance away from the display panel 21. The display panel 21 may include a plurality of sub-pixels 211 arranged in an array. The cylindrical lens grating 22 may include a plurality of cylindrical lenses 221 parallel arranged. The display panel 21 may include a plurality of sub-pixel repeating groups 23, and each sub-pixel repeating group 23 may include a plurality of sub-pixels 211 having four colors.

In the display panel 21, two adjacent sub-pixels may form a main pixel, and any two adjacent main pixels may be different. That is, two sub-pixels 211 in one main pixel may not be one-to-one corresponding to the two sub-pixels 211 in the adjacent main pixel. The main pixels in the 3D display may be formed in a similar way as the main pixels in the 3D display shown in FIGS. 1-3, which may be not repeated here.

In one embodiment, each sub-pixel repeating group 23 may include a plurality of sub-pixels 211 having four colors: red sub-pixels R, green sub-pixels G, blue sub-pixels B and white sub-pixels W. The sub-pixel repeating group 23 may be a 2×4 matrix, i.e., the plurality of sub-pixels 211 included in the sub-pixel repeating group 23 may be arranged as a 2×4 matrix. In the sub-pixel repeating group 23, two adjacent sub-pixels 211 in a same row may have different colors, and two adjacent sub-pixels 211 in a same column may also have different colors.

For example, as shown in FIG. 6, the four sub-pixels 211 in the first row of the sub-pixel repeating group 23 may sequentially be the red sub-pixel R, the green sub-pixel G, the white sub-pixel W and the blue sub-pixel B. The four sub-pixels 211 in the second row of the sub-pixel repeating group 23 may sequentially be the white sub-pixel W, the blue sub-pixel B, the red sub-pixel R, and the green sub-pixel G.

It should be noted that, the sub-pixel layout in the sub-pixel repeating group 23 in FIG. 6 is only illustrative purposes, and is not intended to limit the scope of the present invention. In other embodiments, the sub-pixels in the sub-pixel repeating group 23 may have different colors and a different layout. For example, each sub-pixel repeating group 23 may include a plurality of sub-pixels 211 having four colors: first sub-pixels, second sub-pixels, third sub-pixels, and fourth sub-pixels. The color of the first sub-pixel, the second sub-pixel, the third sub-pixel and the fourth sub-pixel may be any of red, green, blue, white, yellow and cyan, respectively.

In certain embodiments, even the color of the first sub-pixel, the second sub-pixel, the third sub-pixel and the fourth sub-pixel is any of red, green, blue and white, respectively, the four sub-pixels in the first row of the sub-pixel repeating group may not sequentially be the red sub-pixel R, the green sub-pixel G, the white sub-pixel W and the blue sub-pixel B. For example, the four sub-pixels in the first row of the sub-pixel repeating group may sequentially be the red sub-pixel R, the green sub-pixel G, the blue sub-pixel B, and the white sub-pixel W, or the green sub-pixel G, the red sub-pixel R, the blue sub-pixel B, and the white sub-pixel W.

Compared with the 3D displays shown in FIGS. 1-3, the sub-pixel repeating group shown in FIG. 6 may have a different structure or layout, i.e., the sub-pixel repeating group may include sub-pixels in four colors. Compared with the three traditional primary colors (i.e., red, green and blue), the white sub-pixels introduced into the 3D display may provide a higher brightness at a lower driving voltage. In addition, the white sub-pixels W may increase the contrast ratio of the 3D display, and reduce the energy needed to illuminate the white sub-pixels W, because RGB color filters often absorb more than 65% of the total white light used to illuminate the display panel.

Further, compared with the 3D displays shown in FIGS. 1-3, the cylindrical lens 221 shown in FIG. 6 may have a longer length in the orientation of the cylindrical lens 221 when being arranged parallel to the first direction X. Given a fixed dimension of the sub-pixel in the first direction X more 3D viewpoints may be formed. According to the principle of forming 3D viewpoints explained in FIG. 3, five 3D viewpoints may be formed in the 3D display shown in FIG. 6. For example, from left to right, the four 3D viewpoints may sequentially be a first 3D viewpoint, a second 3D viewpoint, a third 3D viewpoint, a fourth 3D viewpoint and a fifth 3D viewpoint.

FIG. 6 also schematically illustrates a regional sub-pixel layout in a first 3D viewpoint V1 and a second 3D viewpoint V2, respectively. As shown in FIG. 6, the cylindrical lens grating 12 may include four cylindrical lenses 221, and each cylindrical lens 121 may equivalently cover five sub-pixel columns: a first sub-pixel column, a second sub-pixel column, a third sub-pixel column, a fourth sub-pixel column and a fifth sub-pixel column from left to right. The length L of the cylindrical lens 221 along the first direction X may be equal to the total length of five successive sub-pixels 211 along the first direction X.

The first 3D viewpoint V1 may consist of four sub-pixel columns. That is, the first 3D viewpoint V1 may consist of every first sub-pixel column covered by the cylindrical lenses 221. Similarly, the second 3D viewpoint V2 may consist of every second sub-pixel column covered by the cylindrical lenses 221. However, the most right cylindrical lens 221 may only cover one sub-pixel column, i.e., the first sub-pixel column. Thus, the second 3D viewpoint V2 may consist of three sub-pixel columns, which may be one sub-pixel column less than the first 3D viewpoint V1.

Thus, the disclosed 3D display may provide more 3D viewpoints (i.e., five 3D viewpoints) and a better 3D image performance. On the other hand, forming five 3D viewpoints in the 3D display may not significantly reduce the image resolution of each 3D viewpoint. That is, an image resolution reduction caused by the excessive 3D viewpoints may be prevented.

In certain embodiments, the cylindrical lenses 221 in the display panel 21 may be arranged parallel to the second direction Y. In certain other embodiments, the cylindrical lenses 221 in the display panel 21 may be arranged parallel to the third direction Q. When the cylindrical lenses 221 are arranged parallel to the second direction Y or the third direction Q, three 3D viewpoints may be formed. The length L of the cylindrical lens 221 along the orientation of the cylindrical lens 121 may also be calculated in a similar way, which may not be repeated here.

Figure 7:
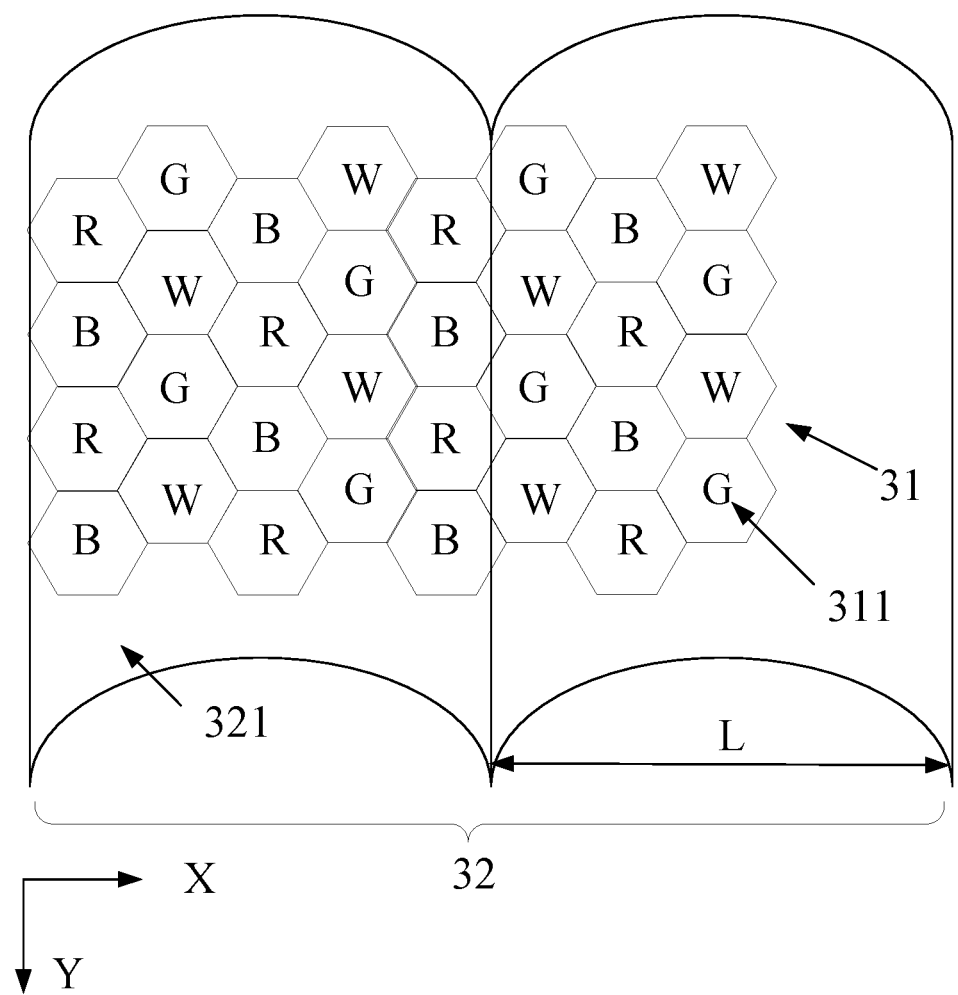
FIG. 7 illustrates a top view of another exemplary 3D display consistent with disclosed embodiments.
Figure 8:
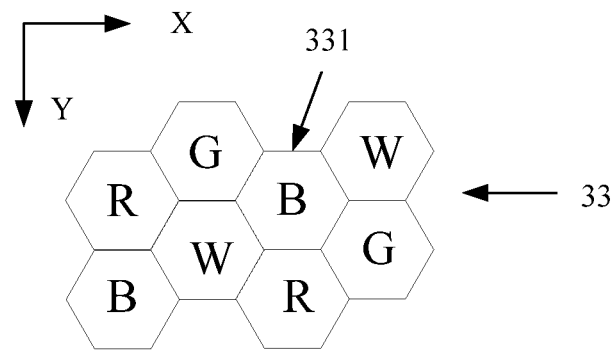
FIG. 8 illustrates a top view of two repeated sub-pixel groups in another exemplary 3D display in FIG. 7 consistent with disclosed embodiments.

FIG. 7 illustrates a top view of another exemplary 3D display consistent with disclosed embodiments. FIG. 8 illustrates a top view of two sub-pixel repeating groups in another exemplary 3D display in FIG. 7 consistent with disclosed embodiments. The similarities between FIGS. 1-3 and FIGS. 7-8 may not be repeated here, while certain differences may be illustrated. Compared with the 3D displays shown in FIGS. 1-3, the sub-pixel repeating group shown in FIG. 7 may have a different structure or layout, and the sub-pixel layout in the display panel may also be different accordingly.

As shown in FIG. 7, the 3D display may include a display panel 31 and a cylindrical lens grating 32 disposed on top of the display panel 31. The cylindrical lens grating 32 may directly contact the display panel 31, or have a certain distance away from the display panel 31. The display panel 31 may include a plurality of sub-pixels 311 arranged in an array. The cylindrical lens grating 32 may include a plurality of cylindrical lenses 321 parallel arranged. The display panel 31 may include a plurality of sub-pixels 311.

In particular, the sub-pixel 311 may have a hexagonal shape, and any one sub-pixel may be adjacent to other six sub-pixels 311. In the display panel 31, two adjacent sub-pixels may form a main pixel, and any two adjacent main pixels may be different. The two sub-pixels 311 in one main pixel may not be one-to-one corresponding to the two sub-pixels 311 in the adjacent main pixel. That is, two adjacent main pixels may have a different sub-pixel layout.

It should be noted that, although the sub-pixel has a hexagonal shape, one main pixel may still have four adjacent main pixels, i.e., one main pixel may be still adjacent to four main pixels. Thus, similar to the 3D display shown in FIG. 1 and FIG. 3, any main pixel may share a sub-pixel 311 with one or more adjacent main pixels to display images. The details may be referred to the explanation of FIG. 1, which may not be repeated here.

The display panel 31 may include a plurality of sub-pixel repeating groups 33. Each sub-pixel repeating group 33 may include a plurality of sub-pixels 311 in four colors: first color sub-pixels, second color sub-pixels, third color sub-pixels, and fourth color sub-pixels. In one embodiment, each sub-pixel repeating group 23 may include eight sub-pixels 311. As shown in FIG. 8, the eight sub-pixels 311 may be arranged as two sub-pixel rows, which may follow the hexagonal shape of the sub-pixel 311. That is, the sub-pixel row may have a wave shape, extending in the first direction X.

In particular, the first color sub-pixels may be red sub-pixels R, the second color sub-pixels may be green sub-pixels G, the third color sub-pixels may be blue sub-pixel B, and the fourth color sub-pixels may be white sub-pixel W. In other embodiments, the sub-pixels may also include yellow sub-pixels, cyan sub-pixels, etc.

As shown in FIG. 7 and FIG. 8, along the second direction Y, all the $(2i-1)^{th}$ sub-pixels may have a same color, and all the $2i^{th}$ sub-pixels may have a same color, where i is a positive integer. The color of the $(2i-1)^{th}$ sub-pixel and the color of the $2i^{th}$ sub-pixel may be different. The second direction Y may be perpendicular to the first direction X.

Further, the cylindrical lenses 321 may be arranged parallel to the first direction X, and each cylindrical lens 321 may cover one sub-pixel repeating group 33 and an adjacent sub-pixel 311 column. Thus, the length L of the cylindrical lens 321 along the first direction X may be equivalent to the total length of five successive sub-pixels 311 along the first direction X.

According to the principle of forming 3D viewpoints explained in FIG. 3, five 3D viewpoints may be formed in the 3D display shown in FIG. 7. Thus, the 3D display may provide a better 3D image display performance. On the other hand, forming five 3D viewpoints in the 3D display may not significantly reduce the image resolution of each 3D viewpoint. That is, an image resolution reduction caused by excessive 3D viewpoints may be prevented.

Figure 9:
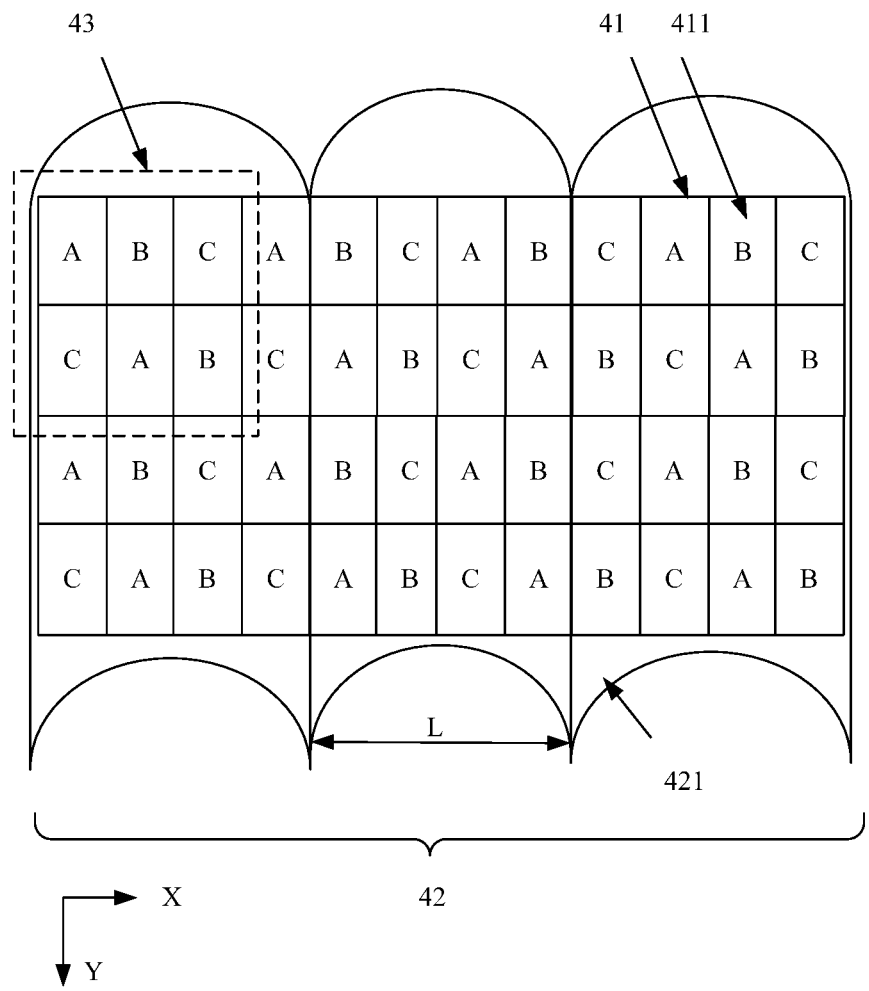
FIG. 9 illustrates a top view of another exemplary 3D display consistent with disclosed embodiments.

FIG. 9 illustrates a top view of another exemplary 3D display consistent with disclosed embodiments. The similarities between FIGS. 1-3 and FIG. 9 may not be repeated here, while certain differences may be illustrated. Compared with the 3D displays shown in FIGS. 1-3, the sub-pixel repeating group shown in FIG. 9 may have a different structure or layout, and the sub-pixel layout in the display panel may also be different accordingly. However, the 3D display may also provide a high image resolution through forming a plurality of main pixels, which may be similar to the 3D displays shown in FIGS. 1-3 and thus is not repeated here.

As shown in FIG. 9, the 4D display may include a display panel 41 and a cylindrical lens grating 42 disposed on top of the display panel 41. The cylindrical lens grating 42 may directly contact the display panel 41, or have a certain distance away from the display panel 41. The display panel 41 may include a plurality of sub-pixels 411 arranged in an array. The cylindrical lens grating 42 may include a plurality of cylindrical lenses 421 parallel arranged. The display panel 41 may include a plurality of sub-pixels 411 in three colors: first color sub-pixels A, second color sub-pixels B, and third color sub-pixels C. The cylindrical lenses 421 may be arranged parallel to the first direction X, i.e., the orientation of the cylindrical lenses 421 may be the first direction X.

In particular, the sub-pixel repeating group 43 may be a 2×3 matrix, i.e., the plurality of sub-pixels 411 included in the sub-pixel repeating group 43 may be arranged as a 2×3 matrix. The three sub-pixels 411 in the first row of the sub-pixel repeating group 43 may sequentially be the first color sub-pixel A, the second color sub-pixel B, and the third color sub-pixel C. The three sub-pixels 411 in the second row of the sub-pixel repeating group 43 may sequentially be the third color sub-pixel C, the first color sub-pixel A, and the second color sub-pixel B.

In the disclosed embodiments, the first color, the second color, and the third color may be red (R), green (G) and blue (B), respectively, which is only for illustrative purpose and is not intended to limit the scope of the present inventions. In certain embodiments, the first color, the second color, or the third color may be yellow, cyan, etc. Further, the first color, the second color, and the third color may be interchangeable.

According to the principle of forming 3D viewpoints explained in FIG. 3, four 3D viewpoints may be formed in the 3D display. In addition, similar to the 3D displays shown in FIGS. 1-8, in the 3D display shown in FIG. 9, a main pixel may also be formed by two adjacent sub-pixels. Thus, the 3D display may also provide a high image resolution. In another embodiment, the cylindrical lenses 421 may be arranged parallel to the second direction Y, and three 3D viewpoints may be formed in the 3D display.

In the disclosed embodiments, along the orientation of the cylindrical lenses, the cylindrical lens may cover one sub-pixel repeating group, i.e., a=1. In other embodiments, along the orientation of the cylindrical lenses, the cylindrical lens may cover more than one sub-pixel repeating groups, i.e., a may be a positive integer larger than 1. The cylindrical lenses may be arranged parallel to the first direction X, the second direction Y, or the third direction Q. The third direction may have angle with respect to the first direction, which may be larger than 0° but smaller than 90°.

Further, based on the cylindrical lens grating with a predetermined structure, the 3D viewpoint may have a same sub-pixel layout as the repeated sub-pixel group. Thus, when displaying a 3D image, the 3D viewpoints may be driven by a same driving method as the display panel for 2D display. Such a 3D display driving method may be simple and low cost. Because an individual driving method may not be required, the 3D display may adopt a same driving chip as the 2D display.

On the other hand, two adjacent sub-pixels in the display panel may form a main pixel. Thus, given a fixed display panel dimension, more main pixels may be formed, and a higher display resolution may be achieved accordingly. Because the 3D viewpoint may have a same sub-pixel layout as the sub-pixel repeating group, two adjacent sub-pixels in the 3D viewpoint may also form a main pixel. Compared with a conventional 3D viewpoint in which a main pixel is formed by three or more sub-pixels, the 3D viewpoints in the disclosed 3D display may provide a higher image resolution, and a better image performance accordingly.

Figure 10:
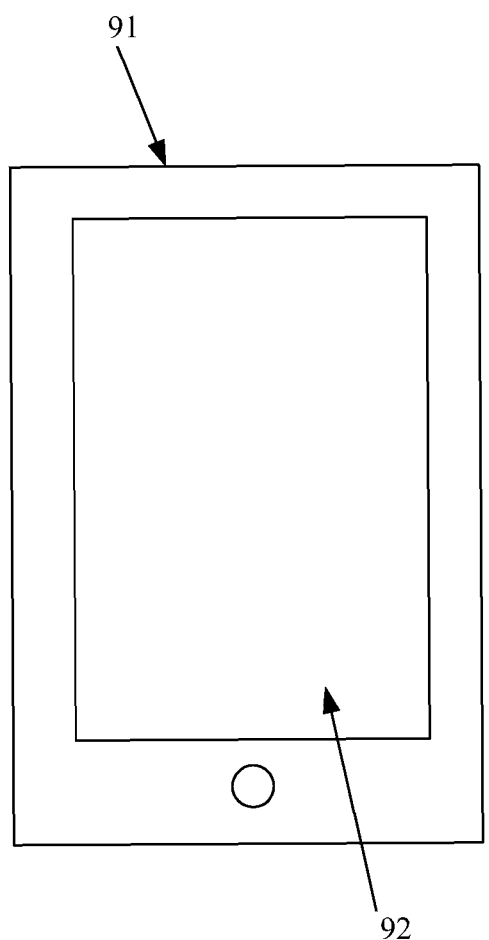
FIG. 10 illustrates an exemplary electronic apparatus consistent with disclosed embodiments.

Based on the disclosed 3D displays, the present disclosure further provides an electronic device. FIG. 10 illustrates a schematic diagram of an exemplary electronic device consistent with disclosed embodiments. As shown in FIG. 10, the electronic device may include a body 91 and a 3D display 92. The 3D display 92 may be any of the above-disclosed 3D displays.

The electronic device may be a mobile phone, a TV, a laptop, a computer, etc. Further, the electronic device may be any electronic device having a display. Because the electronic device includes the disclosed 3D displays, the fabrication cost may be lower, the driving method may be simpler and the 3D viewing experience may be better.

The description of the disclosed embodiments is provided to illustrate the present invention to those skilled in the art. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A three-dimensional (3D) display, comprising:
a display panel including a plurality of sub-pixels arranged in a plurality of sub-pixel repeating groups, wherein the sub-pixels have M number of different colors, the M number of different colors are capable of being mixed to generate a white color, M is a positive integer and greater than 2, M number of successive sub-pixels along a first direction have different colors, two adjacent sub-pixels form a main pixel, any two adjacent main pixels are different, and each sub-pixel repeating group includes one or more main pixels; and
a cylindrical lens grating including a plurality of cylindrical lenses arranged in parallel disposed on top of the display panel and covering all the sub-pixels in the display panel, wherein, when the display panel displays a 3D image, the cylindrical lens grating divides all the sub-pixels into a plurality of 3D viewpoints of the 3D image, the 3D viewpoint has same sub-pixel arrangement sequences as the sub-pixel repeating groups,
wherein the cylindrical lens has a length L=a*b+c along an orientation of the cylindrical lenses, where a is a number of the sub-pixel repeating groups covered by the cylindrical lens along the orientation of the cylindrical lenses, b is a length of one sub-pixel repeating group along the orientation of the cylindrical lenses, and c is a length of one sub-pixel covered by the cylindrical lens along the orientation of the cylindrical lenses.

2. The 3D display according to claim 1, wherein:
each sub-pixel has a rectangular shape;
the plurality of sub-pixels disposed in the display panel are arranged in an array;
a horizontal direction of the array is parallel to the first direction;
a vertical direction of the array is parallel to a second direction perpendicular to the first direction; and
two sub-pixels adjacent in either the horizontal direction or the vertical direction of the array form one main pixel.

3. The 3D display according to claim 2, wherein:
each sub-pixel repeating group includes a group of sub-pixels having three different colors.

4. The 3D display according to claim 3, wherein:
the group of sub-pixels in each sub-pixel repeating group are arranged in an n×m matrix;
three successive sub-pixels in a same row of the matrix have different colors; and two successive sub-pixels in a same column of the matrix have different colors.

5. The 3D display according to claim 4, wherein:
the group of sub-pixels in each sub-pixel repeating group are arranged the n×m matrix, n=2 and m=3.

6. The 3D display according to claim 4, wherein:
the group of sub-pixels in each sub-pixel repeating group are arranged the n×m matrix, n=4 and m=3.

7. The 3D display according to claim 4, wherein:
each sub-pixel repeating group includes a plurality of red sub-pixels, a plurality of green sub-pixels, and a plurality of blue sub-pixels.

8. The 3D display according to claim 2, wherein:
each sub-pixel repeating group includes a group of sub-pixels having four different colors arranged in the n×m matrix;
four successive sub-pixels in a same row of the matrix have different colors; and
two successive sub-pixels in a same column of the matrix have different colors.

9. The 3D display according to claim 8, wherein:
the group of sub-pixels in each sub-pixel repeating group are arranged the n×m matrix, n=2 and m=4.

10. The 3D display according to claim 9, wherein:
each sub-pixel repeating group includes a plurality of red sub-pixels, a plurality of green sub-pixels, a plurality of blue sub-pixels, and a plurality of white sub-pixels.

11. The 3D display according to claim 1, wherein:
each sub-pixel has a hexagonal shape; and
any one sub-pixel is adjacent to other six sub-pixels.

12. The 3D display according to claim 11, wherein:
each sub-pixel repeating group includes a plurality of first color sub-pixels, a plurality of second color sub-pixels, a plurality of third color sub-pixels, and a plurality of fourth color sub-pixels.

13. The 3D display according to claim 12, wherein:
along the second direction, all the (2i−1)-th sub-pixels have a same color, all the 2ith sub-pixels have a same color different from the (2i−1)-th sub-pixels, wherein i is a positive integer, and the second direction is perpendicular to the first direction.

14. The 3D display according to claim 13, wherein:
the first color sub-pixels are red sub-pixels;
the second color sub-pixels are green sub-pixels;
the third color sub-pixels are blue sub-pixels; and
the fourth color sub-pixels are white sub-pixels.

15. The 3D display according to claim 2, wherein:
the number of the sub-pixel repeating groups covered by the cylindrical lens along the orientation of the cylindrical lenses is a=1.

16. The 3D display according to claim 15, wherein:
the cylindrical lenses are arranged parallel to the second direction.

17. The 3D display according to claim 15, wherein:
the cylindrical lenses are arranged parallel to the first direction.

18. The 3D display according to claim 15, wherein:
the cylindrical lenses are arranged parallel to a third direction having an angle with respect to the first direction, wherein the angle is larger than 0° but smaller than 90°.

19. An electronic device, comprising:
a three-dimensional (3D) display comprising a plurality of sub-pixels arranged in a plurality of sub-pixel repeating, wherein the sub-pixels have M number of different colors, the M number of different colors are capable of being mixed to generate a white color, M is a positive integer and greater than 2, M number of successive sub-pixels along a first direction have different colors, two adjacent sub-pixels form a main pixel, any two adjacent main pixels are different, and each sub-pixel repeating group includes one or more main pixels; and
a cylindrical lens grating including a plurality of cylindrical lenses arranged in parallel disposed on top of the display panel and covering all the sub-pixels in the display panel, wherein, when the display panel displays a 3D image, the cylindrical lens grating divides all the sub-pixels into a plurality of 3D viewpoints of the 3D image, the 3D viewpoint has same sub-pixel arrangement sequences as the sub-pixel repeating groups,
wherein the cylindrical lens has a length L=a*b+c along an orientation of the cylindrical lenses, where a is a number of the sub-pixel repeating groups covered by the cylindrical lens along the orientation of the cylindrical lenses, b is a length of one sub-pixel repeating group along the orientation of the cylindrical lenses, and c is a length of one sub-pixel covered by the cylindrical lens along the orientation of the cylindrical lenses.

* * * * *